350-96.2 SR
1/23/79 OR 4,135,781

United States Patent [19]

Archer

[11] 4,135,781

[45] Jan. 23, 1979

[54] OPTICAL FIBER TERMINATION

[75] Inventor: John D. Archer, Halifax, England

[73] Assignee: International Standard Electric Corporation, New York, N.Y.

[21] Appl. No.: 799,262

[22] Filed: May 23, 1977

[30] Foreign Application Priority Data

May 25, 1976 [GB] United Kingdom ............... 21636/76

[51] Int. Cl.[2] ............................................. G02B 5/14

[52] U.S. Cl. .................................. 350/96.20; 65/39; 350/96.18; 350/320; 29/400 M

[58] Field of Search ............... 350/96.20, 96.21, 96.10, 350/96.24, 96.25, 96.18; 65/4

[56] References Cited

U.S. PATENT DOCUMENTS

| | | | |
|---|---|---|---|
| 3,767,910 | 10/1973 | Harrigan | 350/96.24 |
| 3,861,781 | 1/1975 | Hasegawa et al. | 350/96.21 |
| 4,015,894 | 4/1977 | Rocton | 350/96.21 |
| 4,026,633 | 5/1977 | Crick | 350/96.21 |

*Primary Examiner*—Corbin John K.
*Assistant Examiner*—Stewart Levy
*Attorney, Agent, or Firm*—Thomas J. Peterson

[57] ABSTRACT

An optical fiber termination in which a plastic clad optical fiber is pushed into a heated ferrule containing a pierced watch bearing jewel so as to force the bare fiber through the aperture in the jewel. The protruding fiber end is then fused and polished flush with the jewel whereby the fiber end is centered within the jewel aperture.

2 Claims, 8 Drawing Figures

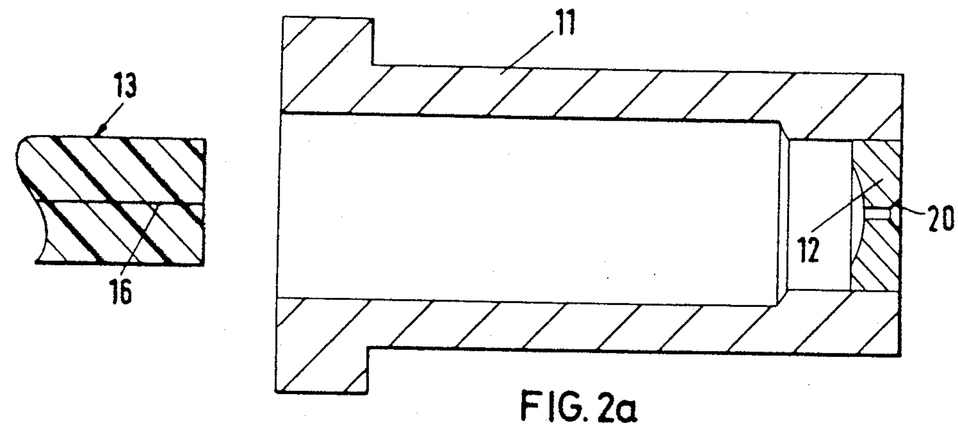
FIG. 2a
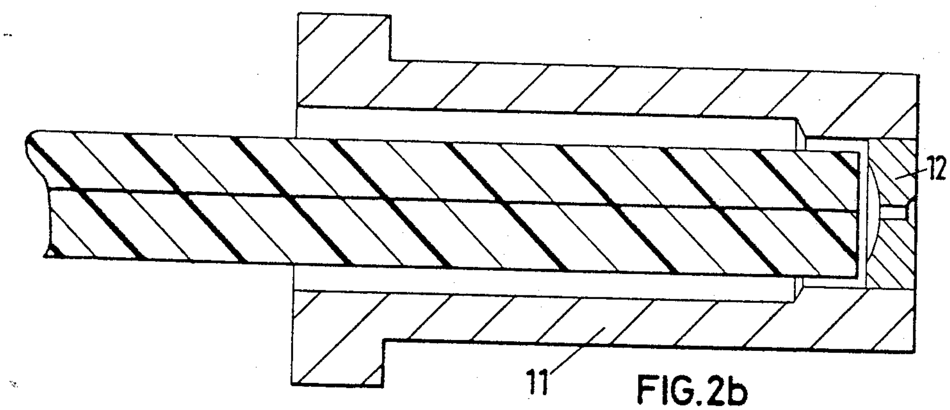
FIG. 2b
FIG. 2c.
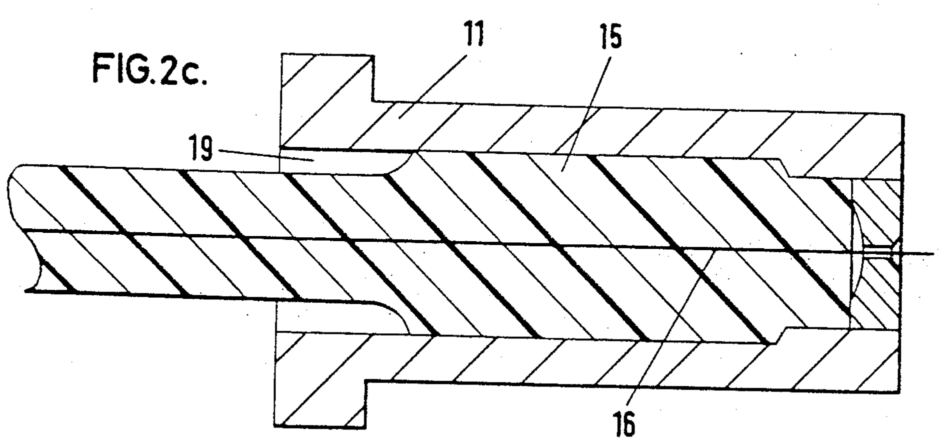

OPTICAL FIBER TERMINATION

BACKGROUND OF THE INVENTION

This invention relates generally to optical fiber terminations and, more particularly, to an optical fiber termination of a watch jewel type and method of performing the termination.

In single fiber optical connectors it has become an accepted practice to protect the exposed fiber in a cylindrical, generally metal, ferrule. A connector assembly is then formed by mounting a pair of similar ferrules in an alignment device. To minimize coupling losses in such a connector assembly, it is essential that each fiber is accurately located on the center axis of its ferrule.

In copending application of M. J. Phillips et al., Ser. No. 679,759, filed Apr. 23, 1976, entitled, "Termination of Optical Fibers", assigned to the same assignee as the present application, there is disclosed an optical fiber termination for plastic clad fibers. The termination comprises a ferrule having a pierced watch bearing jewel mounted at its forward end coaxial with the axis of the ferrule. An optical fiber is mounted lengthwise in the ferrule with its cladding terminating within the ferrule, leaving a forward bared end portion which is threaded into the aperture in the watch jewel. An epoxy is introduced into the ferrule through an opening in the wall of the ferrule to support the bared end portion of the fiber in the ferrule.

It is the purpose of the present invention to provide a simpler method for terminating a plastic clad optical fiber in a ferrule containing a watch jewel and an approved method of centering the fiber within the watch jewel aperture.

SUMMARY OF THE INVENTION

According to one aspect of the present invention, there is provided a method of terminating a plastic clad optical fiber with a connector member of the type having a ferrule adapted to receive the clad fiber and a pierced watch bearing jewel mounted in the ferrule for locating a bared end of the fiber. The ferrule is initially heated to the softening temperature of the plastic cladding of the fiber. The fiber is inserted into the ferrule so as to deform the cladding thereon until a bared end portion of the fiber protrudes through the aperture in the watch jewel. The ferrule and clad fiber are then allowed to cool. Thereafter, the protruding portion of the bared fiber is fused so as to engage the jewel bore and deform it against the watch jewel. The protruding portion of the bared fiber is then machined flush with the outer surface of the watch jewel.

According to another aspect of the present invention, there is provided a plastic clad optical fiber termination in which a plastic clad optical fiber is mounted in a ferrule having a pierced watch bearing jewel fixedly mounted at its forward end. The fiber has a bared end portion threaded into the aperture in the watch jewel. The bare end of the fiber is enlarged at its forward end to fill the forward end of the aperture in the jewel, thereby centering the bared end in said aperture.

BRIEF DESCRIPTION OF THE DRAWINGS

FIGS. 2*a* to 2*c* show successive stages of fitting a plastic clad optical fiber to the ferrule;

DESCRIPTION OF THE PREFERRED EMBODIMENTS

Figure 1:
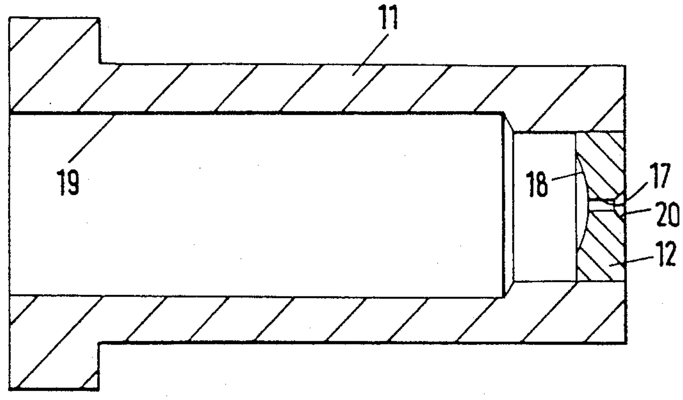
FIG. 1 is a longitudinal section of a ferrule provided with a watch jewel.

Referring to FIGS. 1, and 2*a* to 2*c*, the connector member includes a cylindrical tubular ferrule 11 provided with a pierced watch bearing jewel 12 and adapted to receive a plastic clad optical fiber 13. The clad fiber 13 is fitted to the connector member by first heating the connector member to the softening temperature of the plastic cladding, e.g., polypropylene material, and then pushing the clad fiber 13 into the ferrule until it abuts the watch bearing jewel 12. Further pressure on the clad fiber deforms the now softened plastic cladding 15 allowing the bare fiber 16 to protrude through the aperture 17 of the watch bearing jewel 12. This process is facilitated by a dished recess 18 at the entrance to the aperture 17 of the jewel which guides the fiber 16 into the aperture. During this stage of the assembly procedure, the plastic cladding 15 flows so as to fill the bore 19 of the ferrule 11 as shown in FIG. 2*c*. The ferrule is then allowed to cool so that the plastic cladding hardens and secures the fiber end in the ferrule.

Figure 3A:
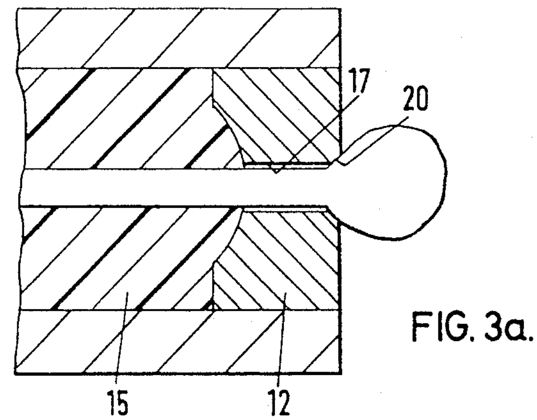
FIGS. 3*a* to 3*c* show the method of terminating the fiber end at the surface of the watch jewel.
Figure 3B:
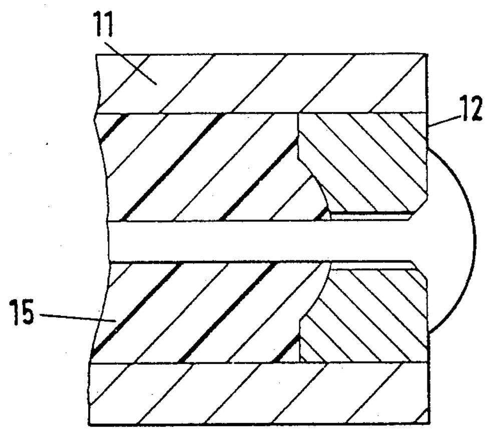
Figure 3C:
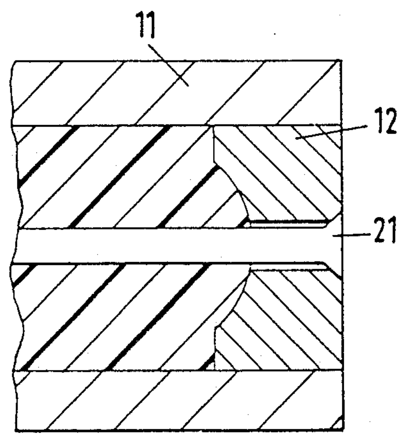

The procedure for preparing the bared fiber end is shown in FIGS. 3*a* to 3*c*. The protruding bared fiber 16 is cut close to the jewel, e.g., with wire cutters, and the cut end is fused in a flame to form a globule as shown in FIG. 3*a* so that the fiber end is wedged into and fills the outer conical throat 20 of the jewel aperture 17. The molten globule is then pressed by an inert, e.g., carbon, tool (not shown) so as to deform the globule against the jewel into the shape of a rivet head (FIG. 3*b*). The fiber end is then lapped and polished flush with the watch jewel 12 leaving an enlarged conical portion 21 which mates with the conical throat of the aperture 17 so as to hold the fiber symmetrically therein. The conical portion of the fiber facilitates efficient light transmitting coupling with a mating connector ferrule.

Figure 4:
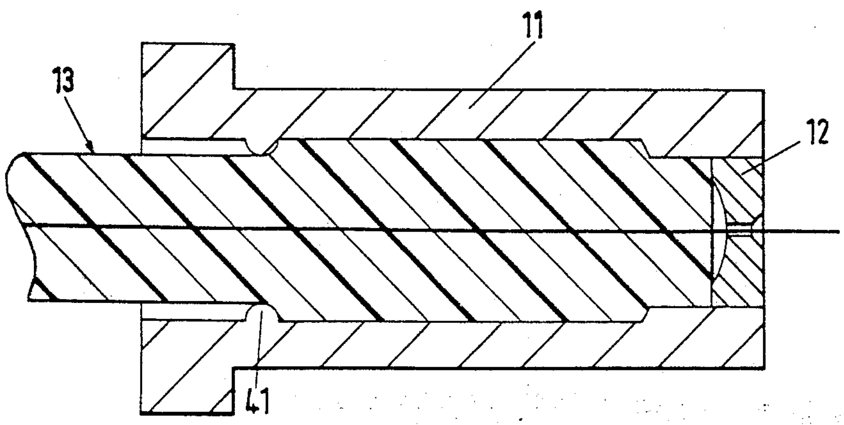
FIG. 4 shows an alternative ferrule.

An alternative ferrule member is shown in FIG. 4. Its construction is similar to that of FIGS. 1 to 3 but it is provided with an internal annular ridge 41 for retaining the heat softened plastic cladding in the bore of the ferrule.

It is to be understood that the foregoing description of specific examples of this invention is made by way of example only and is not to be considered as a limitation on its scope.

What is claimed is:

1. A method of terminating a plastic clad optical fiber with a connector member of the type having a ferrule adapted to receive the clad fiber and a pierced watch bearing jewel mounted in the ferrule for locating a bared end of said fiber, the aperture through said watch jewel having an outer conical throat, comprising the steps of:

heating said ferrule to the softening temperature of the plastic cladding of said fiber;

inserting said clad fiber into said ferrule so as to deform said plastic cladding until a bared end of said fiber protrudes through the aperture in said watch jewel;

cooling said ferrule and clad fiber;

fusing said protruding portion of said bared fiber so as to engage the wall of the jewel aperture and deforming said fused portion against said watch jewel to fill said conical throat to thereby center said bared fiber in said jewel aperture; and machining said protruding portion of said bared fiber end flush with the outer surface of said watch jewel.

2. A plastic clad optical fiber termination comprising:

a hollow cylindrical ferrule;

a pierced watch bearing jewel fixedly mounted at the forward end of said ferrule having an aperture therethrough coaxial with the center axis of said ferrule, said aperture having an outer conical throat;

a plastic clad optical fiber mounted lengthwise in said ferrule and having its cladding terminating within said ferrule; and said fiber having a bared end portion threaded into said aperture and enlarged at its forward end to fill said conical throat of said aperture thereby centering said bared end portion in said aperture.

* * * * *